United States Patent
Hedman, Jr. et al.

[11] 3,856,381
[45] Dec. 24, 1974

[54] VOLTAGE-CONTROLLED DISPERSION OF LIGHT BY LIQUID CRYSTALS

[75] Inventors: Clarence L. Hedman, Jr., Campbell; Karl-Dieter S. Myrenne, Los Altos Hills; Perry H. Vartanian, Jr., Woodside, all of Calif.

[73] Assignee: SCM Corporation, New York, N.Y.

[22] Filed: Aug. 22, 1973

[21] Appl. No.: 390,461

Related U.S. Application Data

[62] Division of Ser. No. 242,709, April 10, 1972, Pat. No. 3,758,195.

[52] U.S. Cl. ........................................ 350/160 LC
[51] Int. Cl. ............................................. G02f 1/16
[58] Field of Search ..................... 350/160 LC, 168

[56] References Cited
OTHER PUBLICATIONS
Greubel et al. "Electrically Controllable Domains in Nematic Liquid Crystals," Applied Physics Letters, vol. 19, pp. 213-15, Oct. 1, 1971.

Carroll: "Liquid Crystal Diffraction Grating," Journal of Applied Physics, vol. 43, pp. 767-70, March, 1972.

*Primary Examiner*—Edward S. Bauer
*Attorney, Agent, or Firm*—Armand G. Guibert; Milton M. Wolson

[57] ABSTRACT

Light of different colors is produced by using as a "diffraction grating" a cell containing a liquid crystal material, with selectively variable fields being applied across the cell to present the different colors at a viewing station. Application is made to monochromators and other devices.

7 Claims, 10 Drawing Figures

VOLTAGE-CONTROLLED DISPERSION OF LIGHT BY LIQUID CRYSTALS

This is a division of application Ser. No. 242,709, filed Apr. 10, 1972, now U.S. Pat. No. 3,758,195.

BACKGROUND OF THE INVENTION

The invention relates to improved electro-optical elements for producing dispersion of white light into its separate spectral components. More specifically, the invention relates to elements of that type which are electrically controlled and which employ liquid crystals.

The term "liquid crystals," as used hereinafter, to a class of compounds which show unusual dual characteristics in transition from solid to liquid. The transition occurs over a temperature range in which the compounds possess fluid flow characteristics of liquids yet demonstrate anistropic optical properties expected only of crystalline solids (see "Molecular Structures and the Properties of Liquid Crystals," by G. W. Gray, Academic Press, New York 1961). These compounds are generally organic, but the phenomenon has also been observed with solutions involving inorganic materials. The transition region where such peculiar characteristics are observed has generally been termed the mesomorphic state or pg,2 "mesophase" and that term will be used hereinafter to define that state of any compound exhibiting the phenomenon.

There has been much research on such liquid crystals, particularly their light-scattering properties, as seen in the above-referenced book by G. W. Gray. Further, the light-scattering properties of such crystals have found use in light valves (e.g., British Patent No. 411,274) and display devices (e.g., U.S. Pat. No. 3,322,485, or "Liquid-Crystal Display Devices," by G. Heilmeier, Vol. 22, No. 4, pp. 100–106, Scientific American, April 1970). Diffraction of monochromatic light by nematic liquid crystal cells ("nematic" referring to mesophases of a known "thread-like" form) has been observed and studied ("Light Diffraction Phenomena in an ac-Excited Nematic Liquid Crystal Sample," by Sun Lu and Derick Jones, J. Appl. Phys. 42, 1971, pp. 2138–2140).

To our knowledge, though prior art disclosures that when subjected to a field above a threshold value, thin layers of liquid crystals produce "diffraction" patterns in light beams, it does not disclose what we have observed — namely, that certain liquid crystals cause the dispersion of a beam of polychromatic light into a plurality of spectra and particular colors, all being angularly-displaced from the beam axis, the angular displacement of the spectra (or colors) increasing as the field strength increases above the threshold value, that is, the spectra (or colors) moving away from the beam axis and from each other as the field strength increases. Also, the presence of the colors, i.e., uniformly colored bands, which we have observed is not discussed, nor is the observed different spatial orientation of spectra of AC-excited liquid crystal cells as compared to that of spectra of DC-excited cells. Thus, by merely varying the field, which may be a DC and/or an AC electric field, selection of desired portions of the dispersed light for use in monochromators, changeable-color displays, and the like, may then be achieved quite simply. In the past, selective lighting with different colors required separate sources of different wavelengths, or required interchangeable filters, or prisms relatively movable with respect to an objective, together with mechanisms or circuits for bringing one or another of the color-selection elements into play.

SUMMARY OF THE INVENTION

This invention lies in the insertion of a transparent cell in the path of a beam of polychromatic light (or monochromatic light in some embodiments), the cell containing a nematic mesomorphic compound (liquid crystal) and a field of a particular magnitude (above a threshold value) being applied to the compound to cause the beam of light to be dispersed and its elements to be angularly displaced relative to a viewing station. The field may be generated by applying a controllable variable source of voltage to transparent electrodes located on the walls of the cell. As the field is increased beyond the threshold value, the dispersed beam moves further away from its initial location off the original path of the beam. Thus, with the observer's station at a fixed location, the entire dispersion can be moved past his view by merely varying the strength of the field. In this manner, a white or polychromatic beam of light can be separated into a continuous spectrum (and into particular components, as will be seen) and successive wavelengths (or selected ones of the particular components) brought sequentially to the view of an observer.

If a monochromatic beam of light is produced by this technique, it can be incorporated in a two-dimensional beam deflector or x-y display controlled solely by varying AC and DC voltages applied across the cell jointly.

Furthermore, if the transparent electrodes are in the form of symbols, upon changing the voltage applied to the electrodes, the color of the symbols displayed at the viewing station (or even the presence of a display) may be selected at will. The change can be effected by the mere turn of a knob, as above, or by automatic switching between two or more sources of voltage if discrete color changes (or an on/off characteristic) are desired.

The invention thus obviates the need for a plurality of sources of light because one source of white light is sufficient to produce any of the colors of the complete spectrum. Also, it has the advantage that there is no need for complex, weighty and expensive electromechanical drives for moving filters, eyepieces, or the like.

BRIEF DESCRIPTION OF THE DRAWING

A detailed description of the invention in connection with the accompanying drawing, in which.

DESCRIPTION OF THE PREFERRED EMBODIMENTS

An electro-optical apparatus basic to the various embodiments of the invention will first be described with reference to FIG. 1. In this figure a source of white or polychromatic light 1, which may be an ordinary incandescent bulb or a fluorescent lamp, is connected by means of leads 2 to a supply of electrical energy 3 (110 VAC, say). Daylight could be used in a known fashion if a more nearly "white" source of light was desired.

Figure 1:
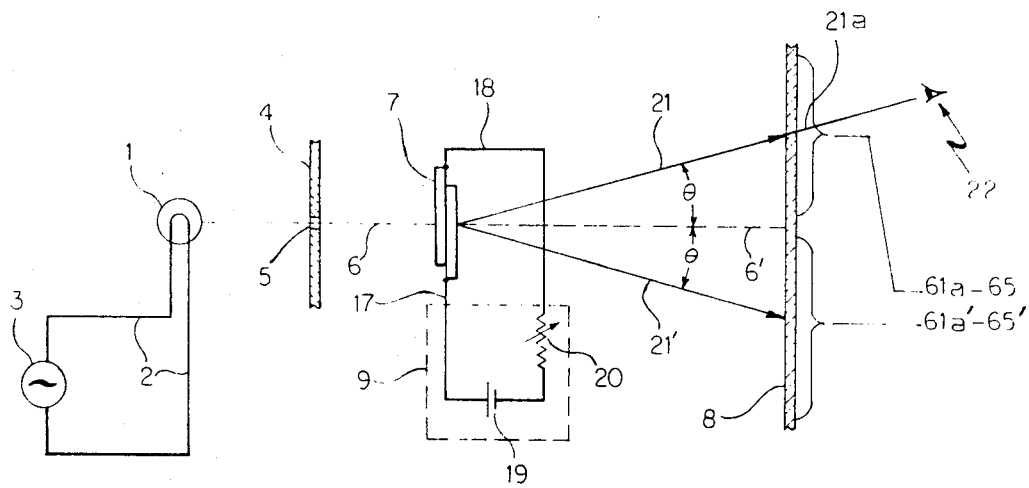
FIG. 1 is a schematic showing the arrangement of the elements in a basic embodiment of the invention utilizing a cell containing a mesomorphic compound as the light-dispersing member.

The luminous energy output of source 1 is passed through beam-forming means which may comprise an opaque shield 4 with a slit (or pinhole) 5 in it, as seen in FIG. 1, but could also comprise a system of lenses or mirrors. The resulting beam of light 6 would normally follow the straight-line path (beam 6') to a viewing station 8 (a ground-glass screen, for example), even with an optically activatable cell 7 interposed, so long as cell 7 is optically inactive.

Figure 2:
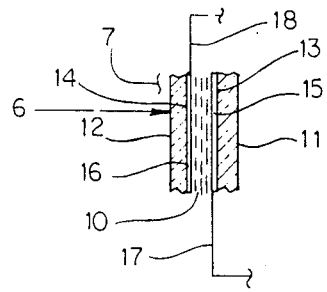
FIG. 2 is a cross-sectional view of the cell of FIG. 1.

As shown in FIG. 2, cell 7 comprises two plates 11 and 12, preferably transparent (e.g., glass, quartz) and each having plane-opposed parallel faces. Plates 11 and 12 are positioned opposite each other so that their adjacent faces 13 and 14, respectively, are parallel. The distance between the inner faces 13 and 14 of the two plates is critical, as will be explained below, and should be less than 25 microns (approximately 1 mil), preferably being between 5 to 12 microns. The plates are prepared with at least one electrically conductive region or strip 15 on inner face 13 of plate 11, and at least one conductive region or strip 16 on the inner face 14 of plate 12. The conductive region or paths 15,16 on the plates are also transparent. This may conveniently be accomplished by depositing thin layers of indium oxide or tin oxide on the desired regions of the inner faces 13,14 on plates 11,12. The two plates 11,12 have their conductive regions positioned substantially in apposition. An electrical lead wire 17 is connected (e.g., by soldering or by use of a drop of silver paste) to the conductive path 15 on plate 11, and another electrical lead wire 18 is connected to the conductive path 16 on plate 12.

A field may be applied by connecting lead wires 17,18 to a variable source of electrical potential 9 (FIG. 1). The source 9 may be direct current supply comprising a battery 19 and a variable resistance 20 connected in series with cell 7 through the lead wires 17,18. (It may also comprise — alone or in superposition — a variable voltage source of alternating current, such as a sine wave generator, as will be seen.)

The faces 13,14 form part of an inner chamber in cell 7 for containing a thin film (see FIG. 2) of a light-dispersing medium 10, the transparent plates 11 and 12 being positioned apart for this purpose by means of spacers (not shown in FIG. 2). The spacing may be maintained by clamping devices, or alternatively through a suitable frame member. For the light-dispersing medium 10, we have found that an organic nematic mesomorphic compound, known commercially as Licristal (TM) No. IV and produced by E. Merck Chemical Works, Darmstadt, Germany under Cat. No. 10105 (the commercial preparation actually being a mixture of the two isomers of p-Butyl-p'-methoxy-azoxybenzene, $(C_4H_9C_6H_4NONC_6H_4OCH_3)$ is preferable, although a similar mixture of N-(p-Ethoxybenzylidine)-p-n-butyl-aniline (50%) and N-(p-Methoxybenzylidine)-p-n-butylaniline (50%) — this last available as Eastman Kodak Cat. No. 1124V — does exhibit the desired phenomenon, but not as satisfactorily. In this respect, it is worthy of note that with both mixtures, the spacing was found to be important — at least within the range of voltages examined — specifically, no effect being obtainable with either mixture when a spacing of about 25 microns (or greater) was attempted, and the optimum effect being obtained with spacings of about 3 to 12 microns. Further, it should be mentioned that the cell should preferably be given a treatment to pre-establish a desired orientation for the nematic molecules, this treatment comprising rubbing the conductive surfaces along the length of the cell, say, (axis perpendicular to the paper in FIGS. 1, 3, 4, and 7) with a cloth or soft paper tissue, in known fashion. Lastly, it should be noted that the preferred mesomorphic compound exhibits the desired mesophase in the temperature range between 16°C and 76°C, these temperatures including room temperature and being above the melting point of the solid compound, but below the temperature at which the molten compound becomes isotropic. It will be understood that hereinafter when reference is made to a mesomorphic compound, it is intended to signify that the compound is in the particular temperature range in which the light-dispersing mesophase is exhibited.

In operation (referring now to FIGS. 1 and 2), via screen 8 observer 22 views light passing through transparent plates 11 and 12, including transparent conductive regions or electrodes 15,16. Light source 1 is positioned so that a beam of light 6 is incident on the transparent plate 11. The angle between the incident light ray and plate 11 is not critical, except insofar as it has a bearing on the location of the output of cell 7. When the electric field between the electrodes 15 and 16 is substantially zero (variable resistance 20 being at maximum), the incident light is transmitted through cell 7 in a regular manner. Under these circumstances, as shown by beam 6' in FIG. 1, only a fraction of the light reaches the eye of observer 22, whose line of sight is off the normal to the transparent plates 11,12; transparent electrodes 15,16; the layer 10 of mesomorphic material; and screen 8. Accordingly, if no field is applied, the observer sees nothing on ground-glass 8 other than the white beam 6' at the center line.

When a weak field is applied between electrodes 15 and 16 by slightly lowering the resistance 20 at the output of voltage source 19, the observer sees no change initially. If the strength of the applied field is continuously increased, no change is visible on viewing screen 8 until a certain threshold value is reached. This threshold value for the applied field differed for the particular mesomorphic compounds mentioned and for particular distances between the two electrodes, but corresponded to a gradient of at least ¼ volt per micron. When the voltage gradient applied between the two electrodes reaches this threshold value, there begins a change in the properties of layer 10 located between the two electrodes and therefore subject to the field. As a result of this change, the incident light is diffracted and a plurality of spectra (or uniformly colored bands, as will be seen) appear, moving away from the center of groundglass 8 as the voltage is increased, such that ultimately the remotest spectrum (or band) reaches the eye of observer 22, as shown by ray 21. Thus, an area of screen 8 which was previously dark, then presents a full spectrum across the width of screen 8 (assuming slit 5 to be of sufficient length), the residual ray 6' at the center line simultaneously changing color also. A similar set of spectra becomes visible on the other side of the center line of screen 8, as shown by the rays 21' in FIG. 1.

Figure 6:
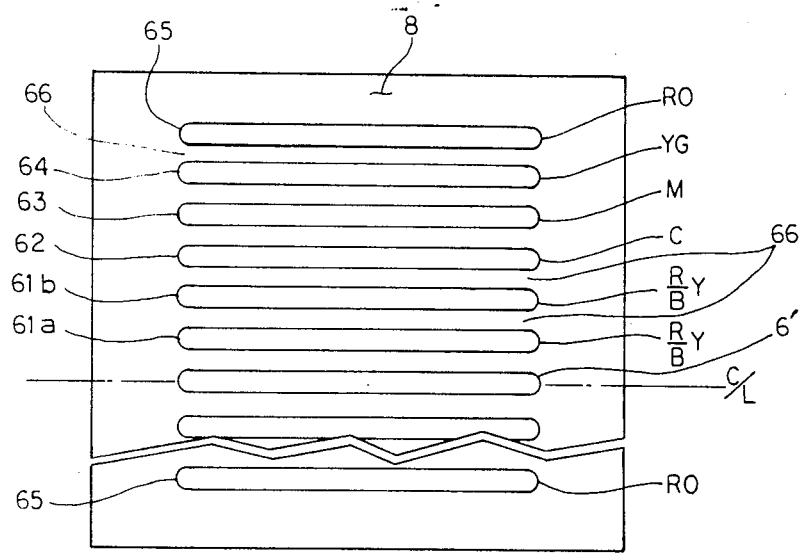
FIG. 6 is a schematic showing the elements of a typical spectral dispersion.

A more detailed view of the dispersion obtained with a slit 5 in shield 4 is shown in FIG. 6, where it is seen that upon passing the threshold value there typically appear on screen 8 above center line CL, two full bright spectra 61a and 61b together with three or four alternating bright bands 62–65 of uniform color (hereinafter referred to as "anomalous dispersion bands"), first a cyan (blue-green) band 62, marked with a C to identify its color, then a magenta band 63, marked M to identify its color, and lastly, a yellow-green band 64 marked YG together with a red-orange band 65, marked RO, adajcent spectra and bands being separated from one another by dark areas 66. Though not detailed in FIG. 6, the output is completely symmetrical about the center line CL, this being indicated by inclusion of a red-orange line 65' near the bottom of screen 8 in FIG. 6. Also not shown are further, much dimmer, repetitions of the basic patterns located beyond those shown, i.e., off screen 8.

Figure 7:
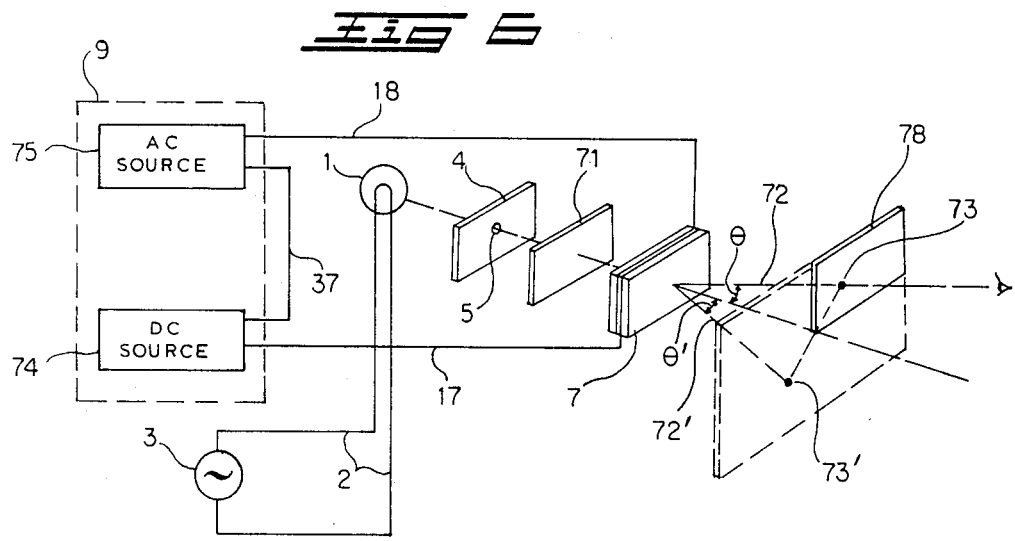
FIG. 7 is a schematic showing a further embodiment of the invention as a beam deflector.

In the foregoing example, light source 1 was polychromatic, but if light beam 6 is made monochromatic (for instance, by insertion of a filter in the path of beam 6, as will be seen later in connection with FIG. 7), it follows that only one color can appear at screen 8 instead of the whole spectrum. The diffracted beam 21 will appear (other conditions not having changed) in the normal spectral position for that color, though the rest of the spectrum is, of course, absent. Thus, a small voltage variation, i.e., from threshold (or above) to below threshold, will be sufficient to effect a change from the color display to no display at all, i.e., an on-off color display. Once the display is turned on, the angle $\theta$ of the diffracted monochromatic beam can be electrically controlled, as previously described.

The dispersion pattern of FIG. 6 is shown as being striated horizontally, which is representative of the pattern obtained with DC voltage biasing. If AC voltage with a frequency above roughly 10 Hz is applied, the striations are rotated 90°, being oriented vertically — as further described below —, but with patterns otherwise identical (except for differences in number of bands and color of the anamalous dispersion bands), and exhibiting similar increase in angular displacement as the amplitude of the AC voltage increases. It is worthy of note that the quality of the AC rotated display is frequency-sensitive, beginning at about 10 Hz, but with best results being obtained at about 100–350 Hz, and dispersion no longer being obtained at 1000 Hz. There is also some beam displacement with increasing frequency, but the effect is small as compared to that obtained with increase in voltage.

While the exact reason for this light-dispersing phenomenon has not been determined, it would seem from our microscopic studies of the previously specified mesomorphic compounds that groups of molecules exist which are parallel-oriented, but not linearly-ordered, i.e., they are off-set from one another for the most part. These groups apparently change from their off-set positions to more nearly linearly-ordered positions when the electrical field across the material reaches the threshold value. This change in alignment of molecular groups, all groups coming together to form long, rod-like, linearly-ordered arrangements, is thought to result in "pseudo-gratings" with attendant light-dispersing properties. With respect to the different orientation observed with AC excitation at frequencies above about 10 Hz microscopic studies show that under these conditions there are no long rods, but linearly ordered arrays of substantially equal length segments of the rods, the gaps between segments being in alignment at right angles to the segments, such that the segments form rows. These rows are believed to account for the rotation of the dispersed pattern obtained with AC excitation of the type described.

Figure 3:
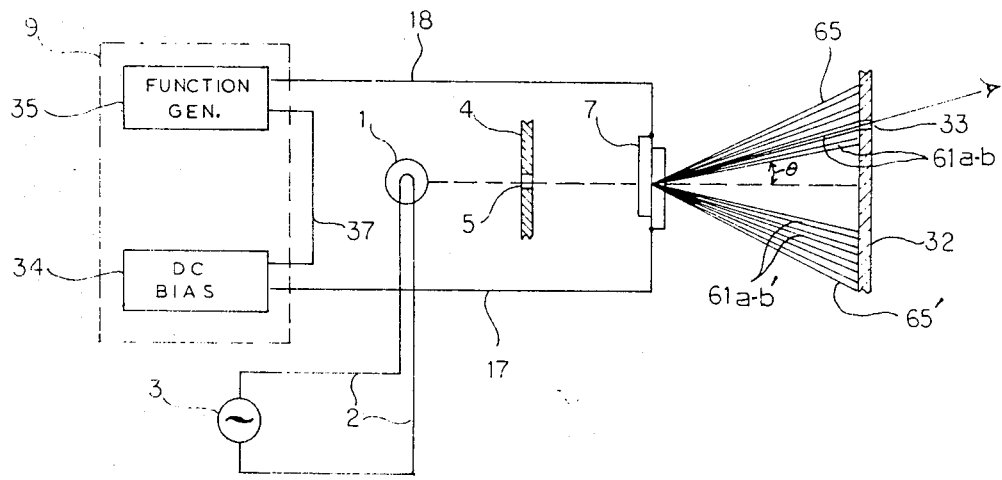
FIG. 3 is a schematic showing an alternative embodiment of the invention as a monochromator.

A first application of the invention is shown in the embodiments of FIG. 3, which presents schematically a monochromator utilizing the basic elements of FIG. 1, except for changes in voltage control 9 and substitution of an opaque screen 32 for frosted-glass screen 8 of FIG. 1. Screen 32 has a narrow aperture 33 in it so as to restrict the operator's view to a suitable narrow region of one of the spectra 61a,b (the anamalous dispersion bands 62–65 previously described in connection with FIG. 6 being excluded, of course, unless those particular wavelengths are of interest). The voltage control 9 now consists of a bias voltage supply 34 and a function generator 35. The former may comprise a battery 19 and variable resistor 20, or a variable transformer with 117 VAC input and a full-wave rectifying bridge on its output, or other known sources of bias voltages (if desired, known voltage-limiting devices may be included to compensate for swings in the nominally 117 VAC input). The latter may comprise a sine-wave generator (as previously mentioned) or a ramp function generator (such as, for instance, the horizontal drive of an oscilloscope or a television set), or may comprise a step function generator providing equal increments of voltage at each step (for instance, similar to the vertical controls for a television raster). Bias voltage supply 34 is connected in series with function generator 35 by a lead 37 and connected to cell 7 by lead 17, as before, but lead 18 is now connected to function generator 35. Accordingly, if the cell 7 has a 6 micron space filled with Licristal (TM) No. IV, and there are selected a bias supply of about 30 volts, DC, and a ramp function swing of about 13 volts, and the aperture 33 is so located as to define an angle $\theta$ of about 20° with the beam 6,6', then application of the ramp voltage superimposed on the bias voltage to which cell 7 is subjected, will cause the spectrum visible through aperture 33 (corresponding to the second spectrum 61b in FIG. 6), to move progressively from red through yellow to blue and abruptly back to red. It will be obvious that if the output is to be restricted to a particular wavelength, then the ramp function may be removed and bias voltage supply 34 alone may be adjusted to vary the angle of diffraction of the desired wavelength until it matches the viewing angle established by the location of aperture 33, e.g., 20° in the above example.

On the other hand, if function generator 35 is a sine wave generator and the cell 7 is biased with a constant DC voltage above threshold, then a low frequency (less than 10 Hz) field can be applied in addition to a DC field, with the result that the spectra will swing slowly back and forth across their original display positions. With proper selection of AC and DC voltages, AC frequency and viewing angle, a full spectrum can be made to pass back and forth across a particular fixed viewing point automatically at whatever scanning rate is desired.

Figures 8A, 8B:
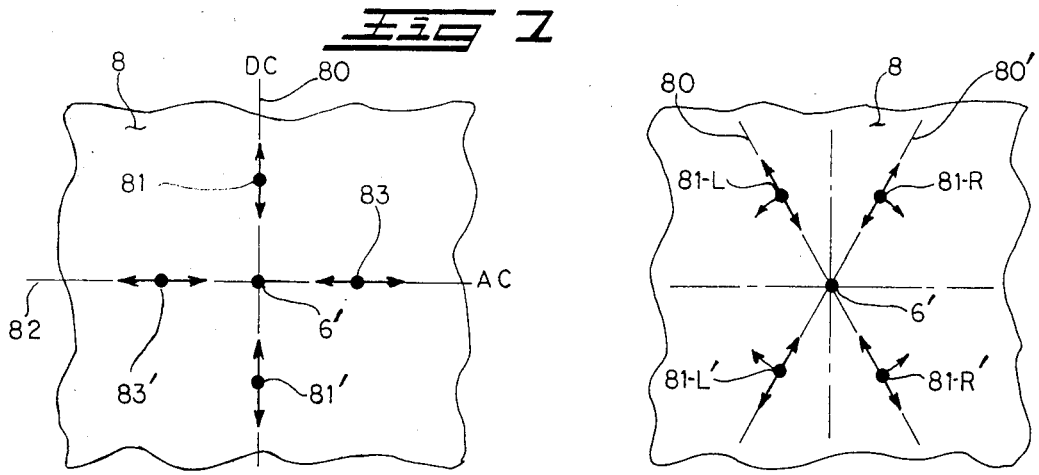
FIGS. 8a,b are a set of two schematics showing the displacement of the monochromatic beam in the embodiment of FIG. 7 according to the type of voltage applied.

As a second application, a two-dimensional beam deflector, or "x-y" display — similar to an oscilloscope — will be discussed with reference to FIGS. 7 and 8a,b. FIG. 7 shows generally a composite of the optical structure of FIG. 1 and the series-connected field generators of FIG. 3. For purposes of such display, as is seen, there are needed light source 1, shield 4 having a pinhole 5 in it, cell 7 and a screen 78 together with a monochromatic filter 71 preferably located in the path of the undiffracted beam 6, i.e., between light source 1 and cell 7. (A thin, collimated monochromatic light beam suitable for this purpose could also be achieved, without shield 4, by using a helium/neon laser, as is known from prior art cited earlier). Filter 71 could also be located in the path of the diffracted light beam 72, i.e., between cell 7 and observer 22, as is obvious. With such arrangement, observer 22 will see a spot 73 of monochromatic light on screen 78, which spot can be laterally displaced by provision of a field across cell 7 by connecting a variable source of potential 9 to the electrodes 15,16 (see FIG. 2) of cell 7. If, now, source 9 comprises a variable source of DC potential 74 connected in series with a source of AC potential 75, as shown in FIG. 7, and in this embodiment the source of variable AC potential 75 having a frequency greater than 10 Hz, but less that 1000 Hz (preferably about 100-350 Hz), then as DC potential alone is changed, spot 73 will be displaced substantially vertically — along the axis 80 as shown by the spots 81, 81' in FIG. 8a — and as the AC potential alone is changed, spot 73 will be displaced at right angles to the DC displacement — along the axis 82 as shown by the spots 83,83' in FIG. 8a — the amount of displacement being dependent on the magnitude of the potential, in each case. The DC displacement has been shown along the vertical axis with the AC displacement along the horizontal axis, but these directions depend upon the direction of rubbing used in the pre-treatment, as described earlier, and there assumed to have been along the length of the cell. In the range of frequency mentioned, the AC potential when combined with the DC potential, causes an orthogonal displacement as shown in FIG. 8b for the case of superposition of an AC signal on a DC signal. From FIG. 8b it will be noted that spot 73 is not only displaced orthogonally, as desired, but is duplicated several times because addition of AC potential causes spot 73 to split into mirror images 81L, 81R and 81L', 81R', one set of spots 81L, 81R' moving along the rotated axis 80 and the other set of spots 81R, 81L' moving along the "image axis" 80a. This limitation can be avoided, as is obvious, by proper location of screen 78 with respect to cell 7 such that the maximum changes in the respective voltages will cause displacements whereby only a single spot 73 will fall within the confines of screen 78 (or a selected portion of that screen — for example, the upper right quadrant, as shown in FIG. 7). It should be remarked that though a screen 78 for observation by the human eye is shown in FIG. 7, the receiving station could also be, for example, a dense array of photo-cells for automatic supply of coordinate information directly to date-processing equipment, in known fashion. Similar remarks apply equally well to the basic embodiment of FIG. 1 and others of its variations, of course.

Figure 4A:
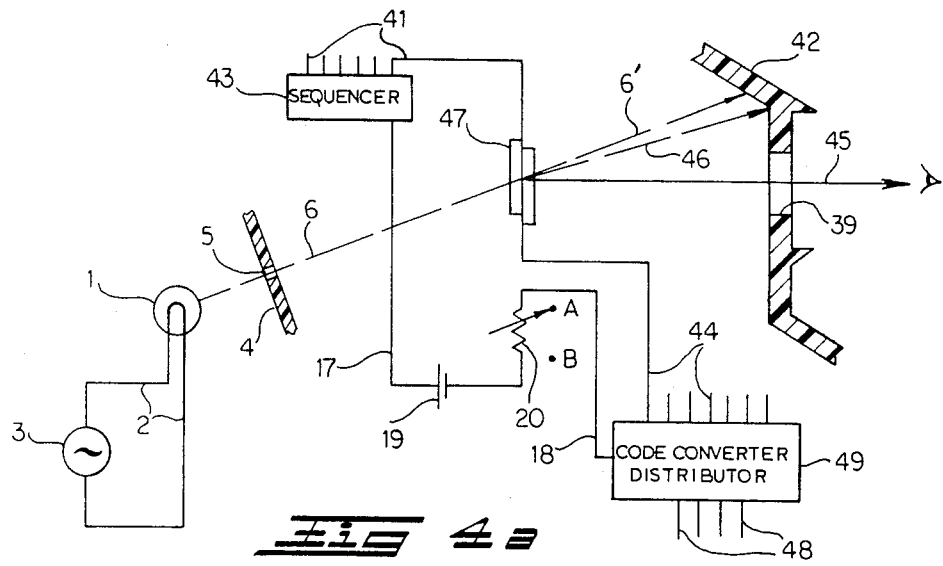
FIGS. 4a,b are a set of two schematics showing another embodiment of the invention as a bi-color display, e.g., red display in FIG. 4a and blue display in FIG. 4b.
Figure 4B:
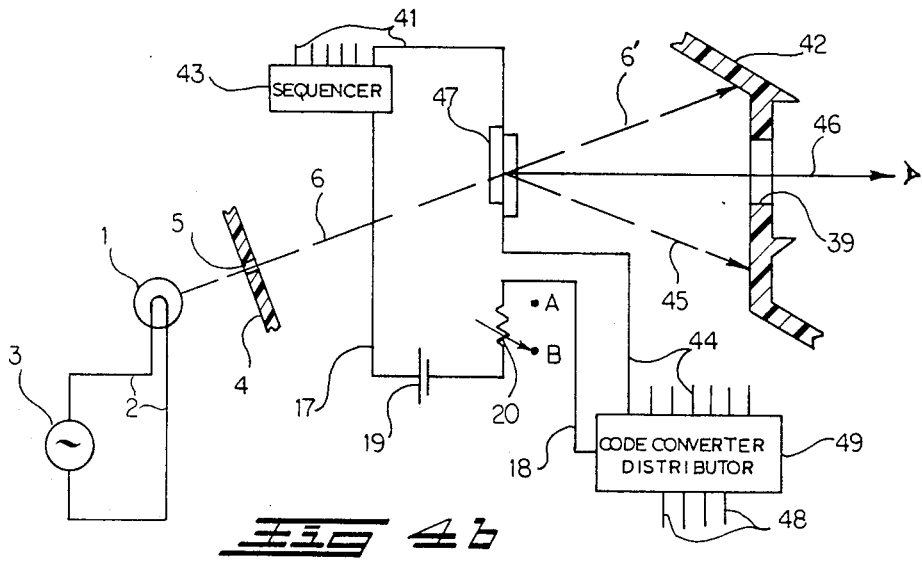
Figure 5:
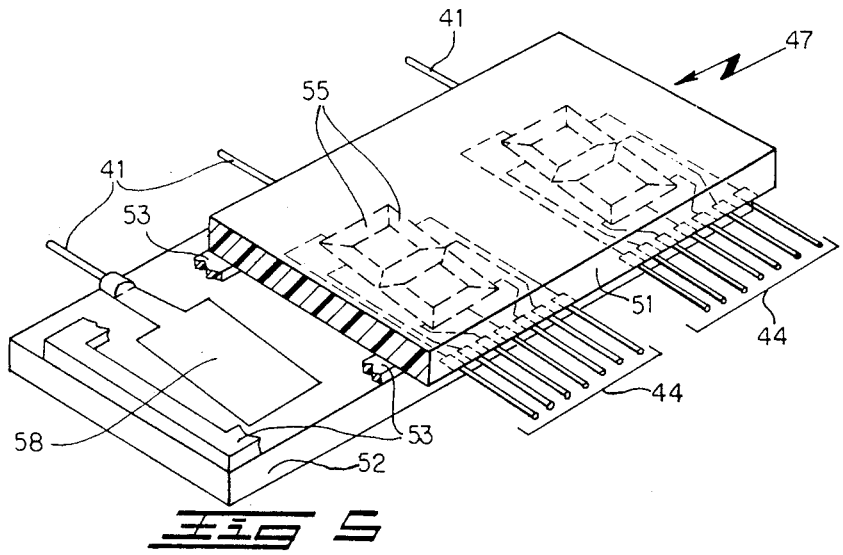
FIG. 5 is an exploded view of the cell of FIG. 4a,b.

A third application of the invention — shown in FIGS. 4a,b and 5 — is a bi-color digital display (the number of colors being limited only for purposes of the description). In this embodiment (see FIGS. 4a,b), the source 1 and the slit 5 in the shield 4 are so located that beam 6 forms an angle of roughly 30°–45° with the normal to the plane of the liquid crystal layer of a cell 47 similar to cell 7. In cell 47 the transparent electrodes (see FIG. 5) on the inner surface of plate 51 (corresponding to plate 11 of FIG. 2) are in the shape of digits formed from selectable electrode segments 55, while the transparent electrodes 58 on the inner surface of plate 52 (corresponding to plate 12 of FIG. 2) are rectangular in shape and of a size approximately equal to the segmented digits. Each electrode 58 is located opposite a set of electrode segments 55, a three-digit display being represented in FIG. 5 although a greater or lesser number of digits could be displayed. As seen in FIG. 4a, with variable resistor 20 set at position A, the particular voltage applied sequentially and selectively — as will be described — to the elements of cell 47 causes the series of digits to appear to the observer's eye in a particular color (blue, say, to represent a positive balance, for instance), as represented schematically by a beam 45, all other beams representing the same digits in different colors being intercepted by the interior of housing 42, as shown by beam 46 and residual beam 6'. For purposes of minimizing possibility of undesired multiple reflections, the interior of housing 42 should be covered with a light-absorbing material, such as a flat black point. If, on the other hand, variable resistor 20 is set at position B (see FIG. 4b), the voltage now applied to cell 47 causes the displayed digits to appear in a different color (red, say, to indicate a negative balance), previously intercepted beam 46 now passing to the observer's eye and beam 45 being intercepted in its turn by the housing 42. It will be recognized that if the beams 45 and 46 comprise spectra such as the bands 61a,b of FIG. 6, then the displayed digit may not be absolutely uniform in color from top to bottom, the quality depending on the relative sizes and locations of the various elements of the systems. If the beams 45,46 correspond to the anomalous dispersion bands 62,63 or 64,65 (or even 62,65), then the uniformity of color of the display is assured, although the specific colors may have to be passed through a modifying filter if the cyan, magenta, etc. colors are not satisfactory. The filter could be installed in aperture 39 of FIGS. 4a,b. It should also be pointed out that if the voltage corresponding to position B is chosen to be such as to position a dark area 66 in the field of vision defined by aperture 39, then one again has an "on/off" color display. From the data given in the discussion of the embodiment of FIG. 3, it is clear that a change of about 7 volts (or less, depending on whether the desired color is at the center of the edge of the spectrum) will suffice to change from the color display to no display at all.

It would also be possible (not shown, but known) to install a lens system between cell 47 and a screen similar to screen 8 in aperture 39 to magnify smaller, hence more uniformly colored digital elements to a desired size for display on screen 8. Another possibility (not shown, but known) would be to use a cell 7 as a source of colored light for direct illumination of a digital display cell 47' similar in structure to cell 47, but filled with one of the prior art nematic liquid crystals exhibiting light-scattering properties as known from the previously-referenced Heilmeier article. The light-scattering display cell 47' might be placed in aperture 39 of FIGS. 4a,b, for example. The source cell 7 would then be located such that the portion of the spectrum falling upon cell 47' would be substantially uniform, i.e., cell 7 sufficiently remote from cell 47 such that the heights of the digits in the latter subtend an arc in the spectrum which is small relative to the arc for the entire spectrum.

For display of variable numerals (FIGS. 4a,b and 5), the electrodes 41 — each corresponding to one order of the digital display in cell 47 — may be connected successively to lead 17 from one end of battery 19 through sequencer 43 (FIGS. 4a,b), timed in synchronization with the serial-by-digit, parallel-by-bit output of a data source (not shown, but a shift register would be an example) supplying digital data in the form of the 1-2-4-8 code, say, on four leads 48, to a code converter/distributor 49. Device 49 has as another input the output of variable resistor 20, and by means of appropriate gating forming part of device 49, supplies that voltage via leads 44 to like segments 55 in all orders of the segmental digital display. Only the selected segments 55 opposite that electrode 58 connected in circuit to battery 19 by sequencer 43 will be optically active at any moment, of course. Further, the cycle time for sequencer 43 must be such that there isn't any noticeable flicker. Other known approaches (such as decoding all digits in parallel, thus obviating the need for sequencer 43) may also be applied without departure from the spirit of the invention. It will be clear, of course, that device 49 could be omitted if the display does not change and also that automatic control could be substituted for manual control of variable resistor 20 in known fashion.

From the foregoing description, it is evident that the basic invention relates to apparatus for separating a beam of polychromatic light into its special components by dispersing the beam of the light with a transparent cell containing a mesomorphic material (liquid crystal). When the mesomorphic material is subjected to a field of a particular magnitude, in particular to an electrical field which may be DC and/or AC, it exhibits light-dispersing characteristics. By providing a screen with a slit as the viewing station and a variable voltage supply connected to electrodes in contact with the mesomorphic material as the field generating means, the invention can be applied to a monochromator, a low voltage on-off color display, and in the case of monochromatic light with a combined AC-DC field applied to the cell, a two-dimensional beam deflector is possible. Furthermore, use of a variable voltage supply in conjunction with electrodes forming symbols — or segments of symbols — in the basic invention provides a selectable-color symbol display.

Although the specification described particular embodiments, and some variations of these embodiments were mentioned, other modifications of the basic invention will be evident to those skilled in the art. Such embodiments are therefore to be considered as merely exemplary, the intent being that the spirit and scope of the invention be limited only by the appended claims.

What is claimed is:

1. In apparatus for separating polychromatic light into its spectral components, said apparatus comprising a source of polychromatic light, a beam-defining member cooperating with said source, a dispersion member aligned with the beam, and a viewing station for the dispersed light, said viewing station having portions non-aligned with said beams and said dispersion member being located between said beam-defining member and said viewing station, the improvement wherein said dispersion member comprises:

a cell having walls transparent to said light, a mesomorphic material in said cell, said mesomorphic material having light-dispersion characteristics when subjected to a field of particular magnitude, said dispersion comprising formation of a plurality of spectra, displaced angularly from said beam and onto non-aligned portions of said viewing station, means to generate a field of variable magnitude greater than said particular magnitude, and means to subject said mesomorphic material to said variable field, said spectra being displaced in an amount dependent upon the magnitude of said field.

2. The combination of claim 1, wherein said field-generating means comprises a source of electrical potential and said field-subjecting means comprise electrically-conductive, light-transmitting coatings on said cell walls and electrical conductors connecting said coatings in circuit with said source of potential.

3. The combination of claim 2, wherein said source of potential comprises an alternating current source having a frequency between 10 Hz and 1000 Hz.

4. The combination of claim 2, wherein said coatings are on opposed ones of said cell walls, said walls being spaced apart less than 25 microns.

5. The combination of claim 4 wherein said mesomorphic material has a nematic mesophase.

6. The combination of claim 5, wherein said nematic mesomorphic material comprises an isomer of p Butyl-p' methoxy asoxybenzene.

7. The combination of claim 5, wherein said mesomorphic material comprises a mixture of N-(p Methoxybenzylidine)-p n-butylaniline and N-(p Ethoxybenzylidine)-p n-butylaniline.

\* \* \* \* \*